US008595130B2

(12) United States Patent  (10) Patent No.: US 8,595,130 B2
Johnson et al.  (45) Date of Patent: Nov. 26, 2013

(54) MODIFIABLE MORTGAGE

(75) Inventors: Shane A. Johnson, Charlotte, NC (US);
Lisa D. Curry, Warwick, RI (US);
Pamela Marguerite Howard, Gresham, OR (US); Michael J. Kelly, Minneapolis, MN (US)

(73) Assignee: Bank of America Corporation, Charlotte, NC (US)

( * ) Notice: Subject to any disclaimer, the term of this patent is extended or adjusted under 35 U.S.C. 154(b) by 514 days.

(21) Appl. No.: 12/872,929

(22) Filed: Aug. 31, 2010

(65) Prior Publication Data

US 2011/0022512 A1   Jan. 27, 2011

Related U.S. Application Data

(63) Continuation-in-part of application No. 12/328,895, filed on Dec. 5, 2008.

(51) Int. Cl.
*G06Q 40/00* (2012.01)
(52) U.S. Cl.
USPC .................................... 705/38; 705/37
(58) Field of Classification Search
USPC .......................................................... 705/38
See application file for complete search history.

(56) References Cited

U.S. PATENT DOCUMENTS

| 5,870,720 | A | 2/1999 | Chusid et al. |
| 7,089,503 | B1 | 8/2006 | Bloomquist et al. |
| 7,249,099 | B2 | 7/2007 | Ling |
| 7,860,787 | B2 * | 12/2010 | Oppenheimer et al. ........ 705/38 |
| 2001/0054022 | A1 * | 12/2001 | Louie et al. ...................... 705/38 |
| 2002/0046144 | A1 | 4/2002 | Graff |
| 2008/0120211 | A1 | 5/2008 | Oppenheimer et al. |
| 2008/0120215 | A1 | 5/2008 | Wagner |

OTHER PUBLICATIONS

Lee J.Y; Lee Y.J; Shin W.Y; Yoo B.S; Yoon K.S; Yoon T.W; System and Method for Offering Variable Loan Using Changes of Interest Rate Based on Loan Agreement; 2005; 20/5/11 (Item 8 from file: 350).*
Raines, Franklin; St. John, Julie G; Quinn, Michael ; Lewis; Robert , Farrell; William F; Kemper, John; Processing Data Pertaining to Financial Assets; 2002; 13/3K/12 (Item 10 from file: 349).*
Gang John; Nolan William R III, Kemper John L.; Voth David W; Kopperman Peter G; System and Method for Facilitating Sale of Loan to a Secondary Market Purchaser; 2002.*
Utility U.S. Appl. No. 12/328,895, filed Dec. 5, 2008, Pamela M. Howard et al.

(Continued)

*Primary Examiner* — Ella Colbert
*Assistant Examiner* — Michael Cranford
(74) *Attorney, Agent, or Firm* — Michael A. Springs; Moore & Van Allen PLLC; Ester F. Queen

(57) ABSTRACT

Embodiments of the present invention relate to methods and apparatuses for providing, processing, and/or servicing a mortgage loan having one or more exercisable options. For example, in some embodiments, a method is provided that includes storing, in a non-transitory computer-readable medium, one or more terms of an exercisable option, where the option is incorporated into a mortgage loan, where exercising the option results in one or more terms of the mortgage loan being modified, and where one or more terms of the option are based at least partially on a non-mortgage relationship between a borrower associated with the mortgage loan and a lender associated with the mortgage loan.

24 Claims, 6 Drawing Sheets

(56) References Cited

OTHER PUBLICATIONS

Utility U.S. Appl. No. 12/872,922, filed Aug. 31, 2010, Shane A. Johnson et al.

Harney, Kenneth R., "Freddie Mac's 'Modifiable Mortgage' Could Be The Rage Next Time Interest Rates Drop", published Mar. 11, 2002 (5 pages total); http://realtytimes.com/rtpages/20020311_modifiablemtg.htm.

Lewis, Holden (Bankrate.com), "Mortgage Modification, Easy Refis Available", Jul. 3, 2002 (2 pages total); http://www.bankrate.com/brm/news/mtg/20020704a.asp.

* cited by examiner

MODIFIABLE MORTGAGE

CROSS-REFERENCE TO RELATED APPLICATIONS

The present application is a continuation-in-part of, and claims priority to, U.S. patent application Ser. No. 12/328,895, filed on Dec. 5, 2008, and entitled "Loan Product with Convertible Payment Terms," which is incorporated herein by reference in its entirety.

FIELD

In general terms, embodiments of the present invention relate to methods and apparatuses for providing, processing, and/or servicing a mortgage loan having one or more exercisable options.

BACKGROUND

Today, most mortgage lenders do not allow borrowers to customize their mortgage loans; instead, lenders typically require borrowers to choose a mortgage loan that has a pre-defined, standard, and/or pre-packaged set of terms, including, for example, the value of the interest rate, the type of the interest rate, the term of the mortgage loan, the number of mortgage payments, the frequency in which those mortgage payments are paid, the amount of the mortgage payments, and so on. However, borrowers are increasingly unsatisfied with this "one-size-fits-all" approach. Thus, there is a need to provide methods and apparatuses for providing, processing, and/or servicing mortgage loans that are more tailored to the preferences and needs of individual mortgage borrowers.

SUMMARY OF SELECTED EMBODIMENTS OF THE PRESENT INVENTION

In general terms, embodiments of the present invention relate to methods and apparatuses for providing, processing, and/or servicing a mortgage loan having one or more exercisable options. For example, some embodiments of the present invention provide a method that includes storing, in a non-transitory computer-readable medium, one or more terms of an exercisable option, where the option is incorporated into a mortgage loan, where exercising the option results in one or more terms of the mortgage loan being modified, and where one or more terms of the option are based at least partially on a non-mortgage relationship between a borrower associated with the mortgage loan and a lender associated with the mortgage loan.

In some embodiments, the method further includes: (a) determining the non-mortgage relationship; and (b) determining the exercisable option based at least partially on the non-mortgage relationship. In some embodiments, the method includes: (a) determining the non-mortgage relationship; and (b) determining that the borrower associated with the mortgage loan is eligible to receive the option based at least partially on the non-mortgage relationship. In still other embodiments, the method additionally or alternatively includes modifying, upon exercise of the option, the one or more terms of the mortgage loan in accordance with the option.

In some embodiments of the method, the exercising the option results in a modification of at least one of an interest rate, loan term, amortization term, number of loan payments, amount of the loan payments, or frequency of the loan payments associated with the mortgage loan. In some embodiments, the one or more terms of the option include a term modification feature, such that exercising the option results in the term of the mortgage loan being extended, where the length of the extension is based at least partially on the non-mortgage relationship. In other embodiments, the one or more terms of the option include a loan payment type modification feature, such that exercising the option results in a loan payment amount type associated with the mortgage loan being modified from a composite amount to an interest-only amount.

In some embodiments, the one or more terms of the option include a loan payment amount modification feature, such that exercising the option results in a loan payment amount associated with the mortgage loan being modified from a first amount to a second amount, where the second amount is based at least partially on the non-mortgage relationship. In other embodiments, the one or more terms of the option additionally or alternatively include an interest rate modification feature, such that exercising the option results in the value of a fixed interest rate of the mortgage loan being modified from a first value to a second value, where the second value is based at least partially on the non-mortgage relationship. In some embodiments, the one or more terms of the option include the number of times the option can be exercised, where the number is based at least partially on the non-mortgage relationship.

In some embodiments of the method, the non-mortgage relationship includes a value of one or more non-mortgage accounts, where the one or more non-mortgage accounts are associated with the borrower and maintained by the lender. In other embodiments, the non-mortgage relationship additionally or alternatively includes a length of time that one or more non-mortgage accounts associated with the borrower have been maintained by the lender. In still other embodiments of the method, one or more identifiers are assigned to the non-mortgage relationship to indicate the relative strength of the non-mortgage relationship, and the one or more terms of the option are based at least partially on the one or more identifiers.

As another example, some embodiments of the present invention provide an apparatus that includes a non-transitory computer-readable medium having one or more terms of an exercisable option, where the option is incorporated into a mortgage loan, where exercising the option results in one or more terms of the mortgage loan being modified, and where one or more terms of the option are based at least partially on a non-mortgage relationship between a borrower associated with the mortgage loan and a lender associated with the mortgage loan.

In some embodiments, the apparatus further includes a processor that is configured to: (a) determine the non-mortgage relationship; (b) determine the exercisable option based at least partially on the non-mortgage relationship; and/or (c) determine that the borrower associated with the mortgage loan is eligible to receive the option based at least partially on the non-mortgage relationship. In other embodiments, the processor is configured to modify, upon exercise of the option, the one or more terms of the mortgage loan in accordance with the option.

As still another example, some embodiments of the present invention provide a computer program product having a non-transitory computer-readable medium. In some embodiments, the non-transitory computer-readable medium includes computer-executable program code portions stored therein, where the computer-executable program code portions include: (a) a first program code portion operable to determine a non-mortgage relationship between a borrower associated with a mortgage loan and a lender associated with the mortgage loan; and (b) a second program code portion operable to determine an exercisable option to incorporate into the mortgage loan, where one or more terms of the option are based at least partially on the non-mortgage relationship.

In some embodiments, the computer program product further includes a third program code portion operable to determine that the borrower associated with the mortgage loan is eligible to receive the option based at least partially on the non-mortgage relationship. In some embodiments, the computer program product includes: (a) a third program code portion operable to incorporate the option into the mortgage loan; and (b) a fourth program code portion operable to modify, upon exercise of the option, one or more terms of the mortgage loan in accordance with the option.

As a further example, some embodiments of the present invention provide a method that includes incorporating an exercisable option into a mortgage loan, where exercising the option results in one or more of the terms of the mortgage loan being modified, and where the incorporating the exercisable option is based at least partially on a non-mortgage relationship between a borrower associated with the mortgage loan and a lender associated with the mortgage loan. As another example, some embodiments of the present invention provide a method that includes modifying, upon exercise of an option, one or more terms of the mortgage loan, where the option was incorporated into the mortgage loan prior to the exercise, and where the modifying the exercisable option is based at least partially on a non-mortgage relationship between a borrower associated with the mortgage loan and a lender associated with the mortgage loan.

BRIEF DESCRIPTION OF THE DRAWINGS

Figure 1:
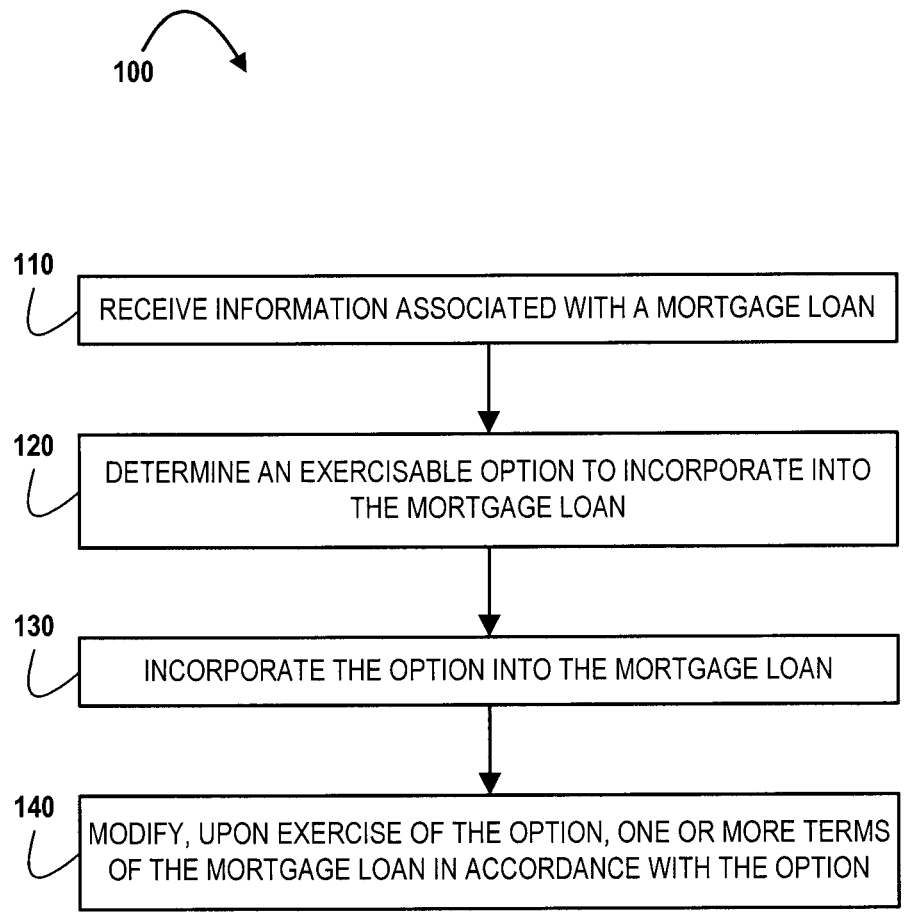
Figure 2:
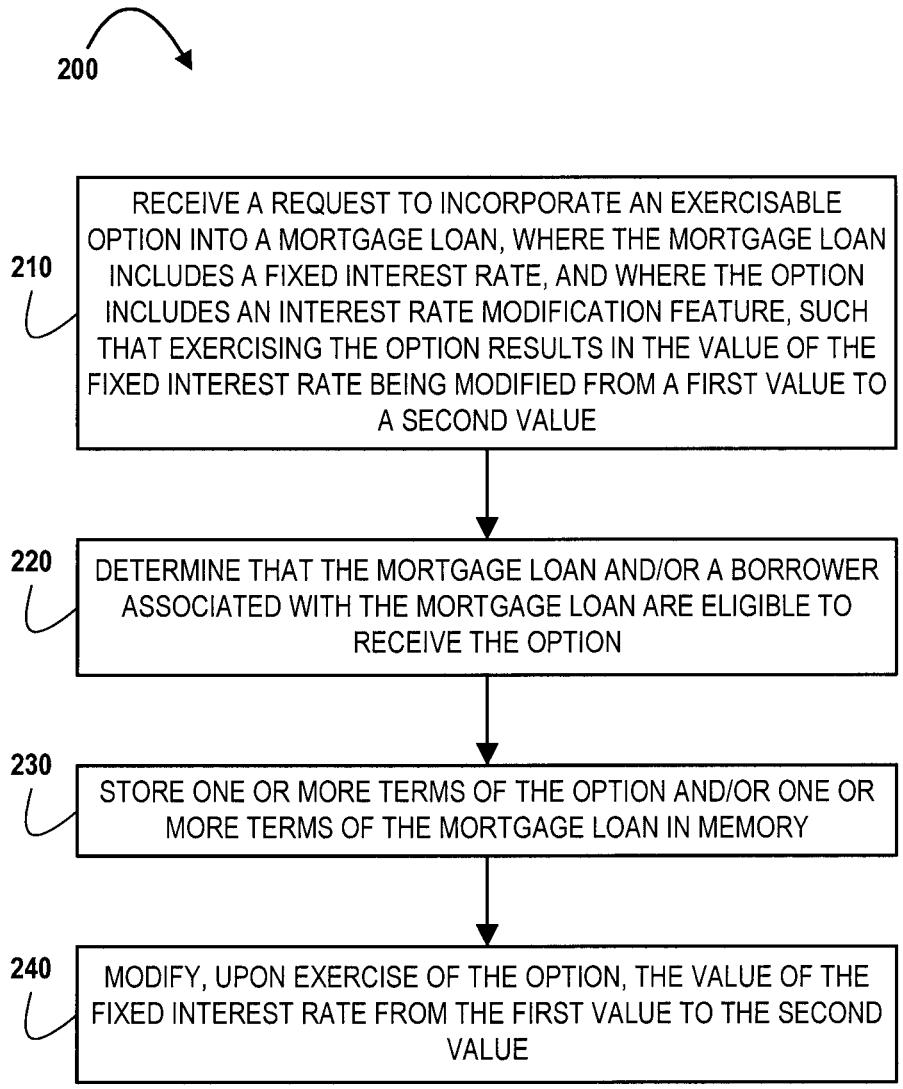

Having thus described some embodiments of the present invention in general terms, reference will now be made to the accompanying drawings, wherein:

FIG. 1 is a flow diagram illustrating a general process flow of an apparatus for providing, processing, and/or servicing a mortgage loan having an exercisable option, in accordance with an embodiment of the present invention;

FIG. 2 is a flow diagram illustrating a general process flow of an apparatus for providing, processing, and/or servicing a mortgage loan having an exercisable option, where the option includes an interest rate modification feature, in accordance with an embodiment of the present invention.

Figure 3:
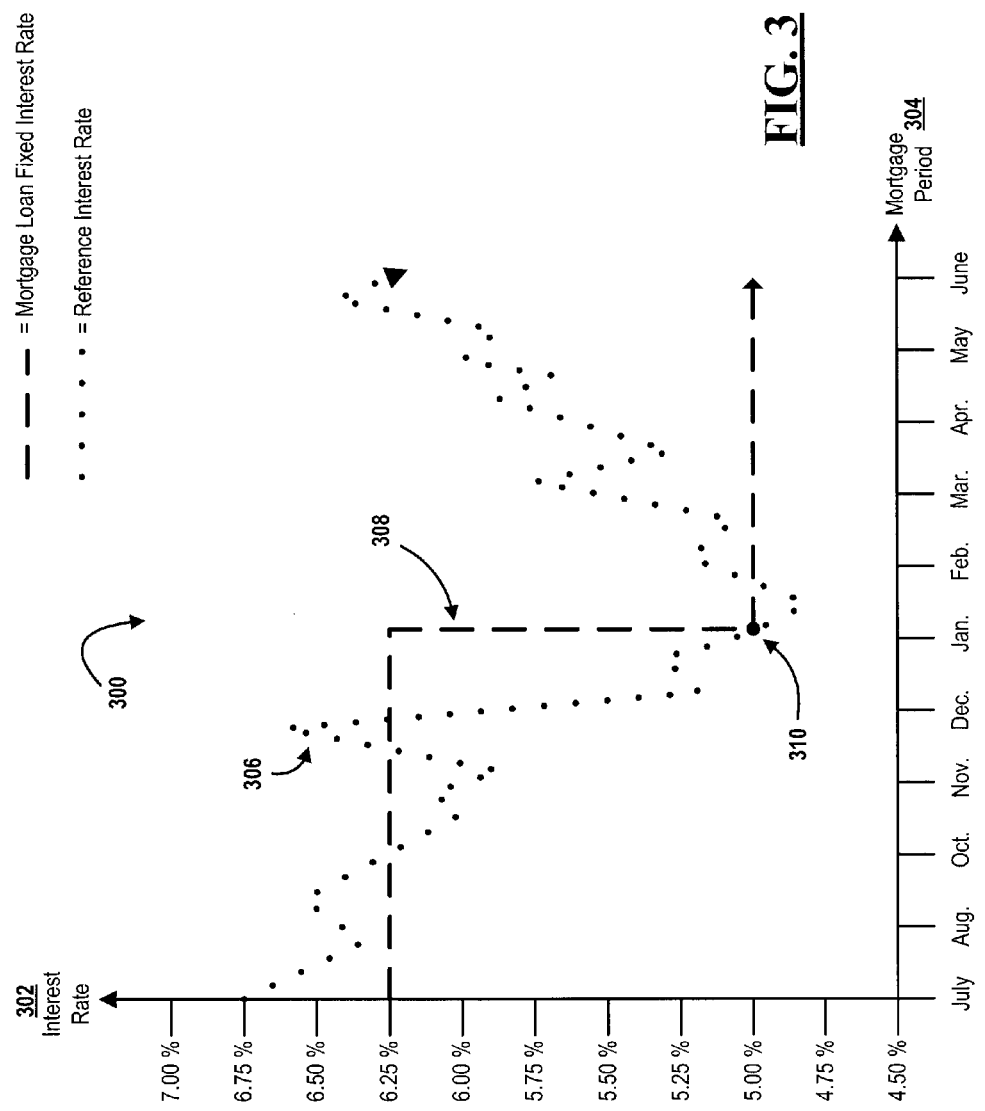
Figure 4:
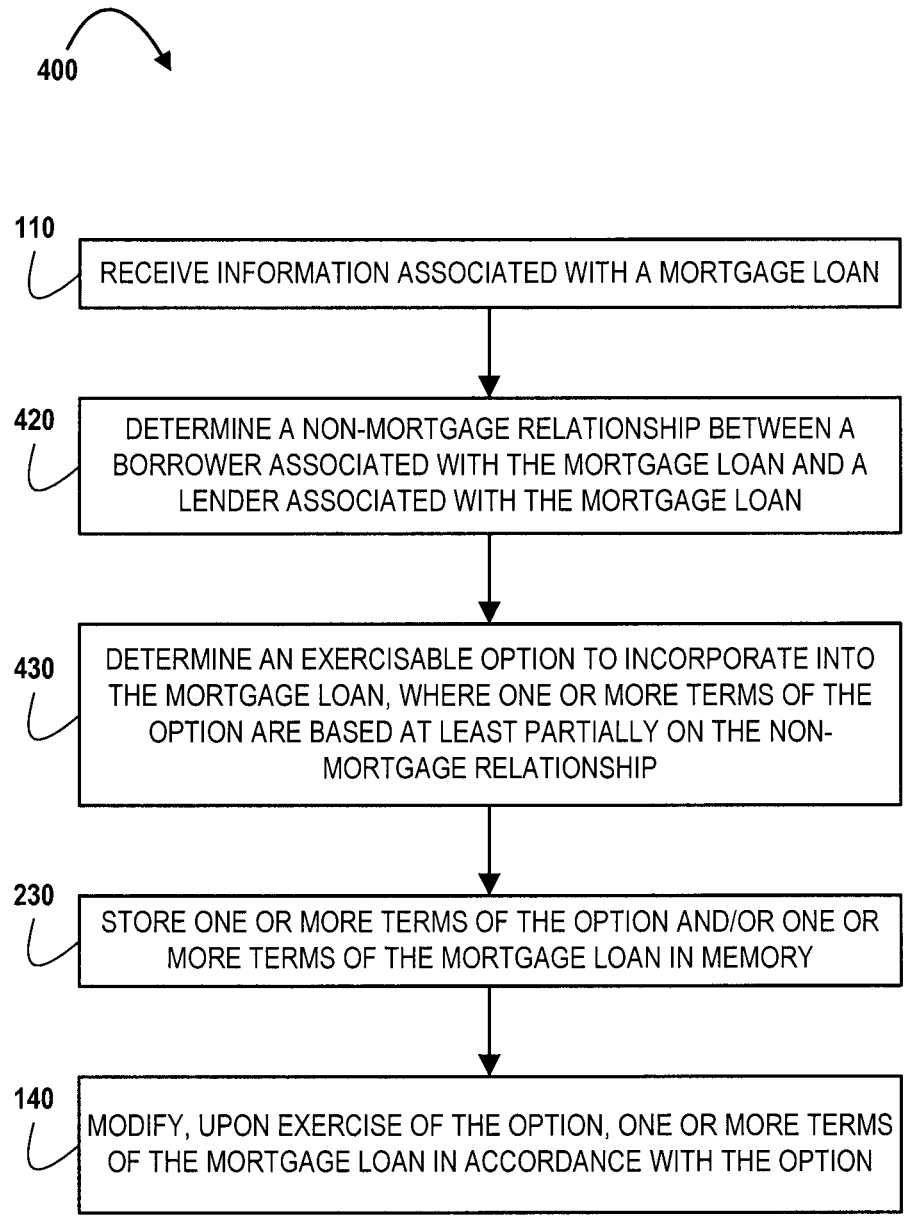
Figure 5:
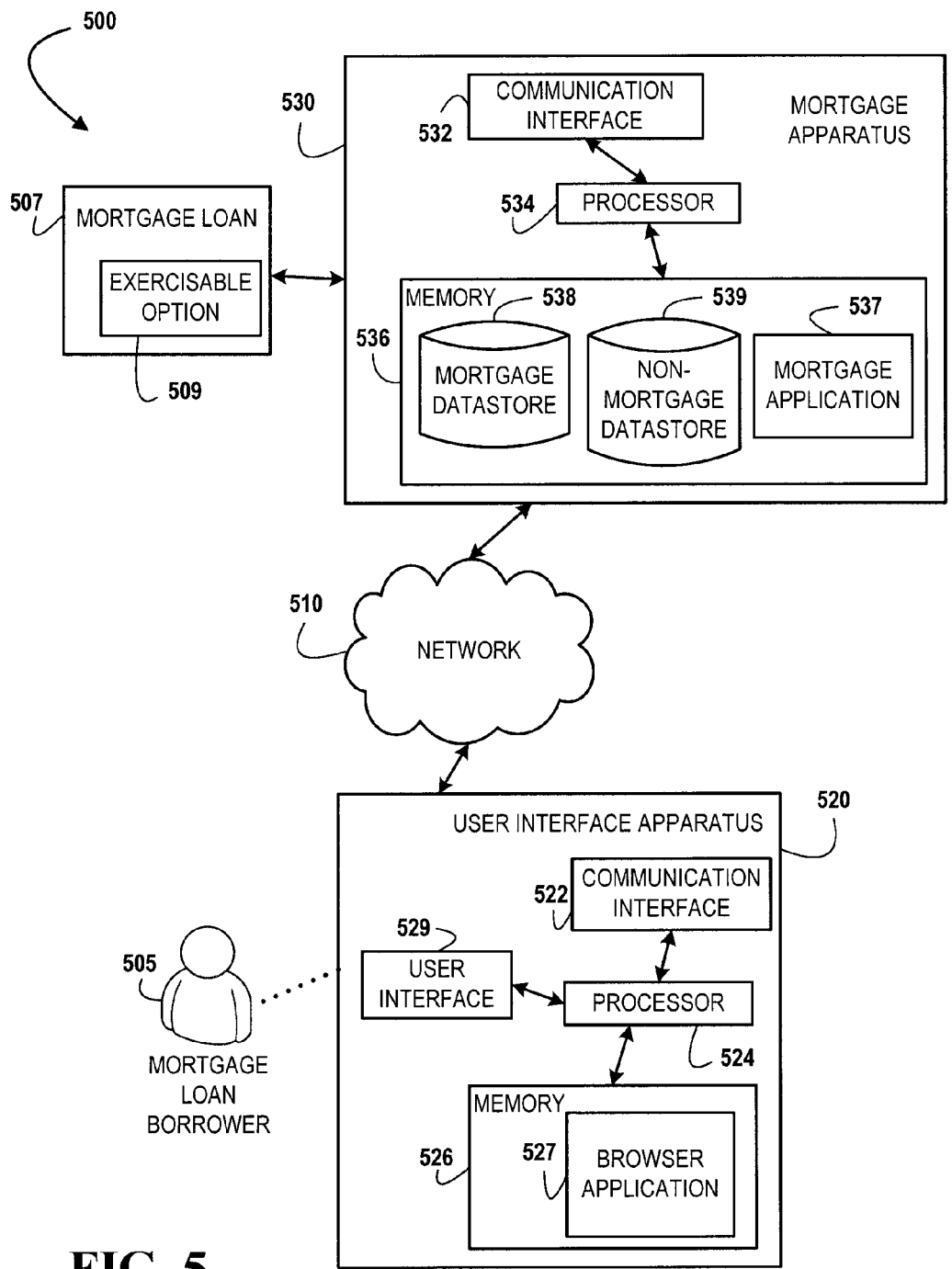
Figure 6:
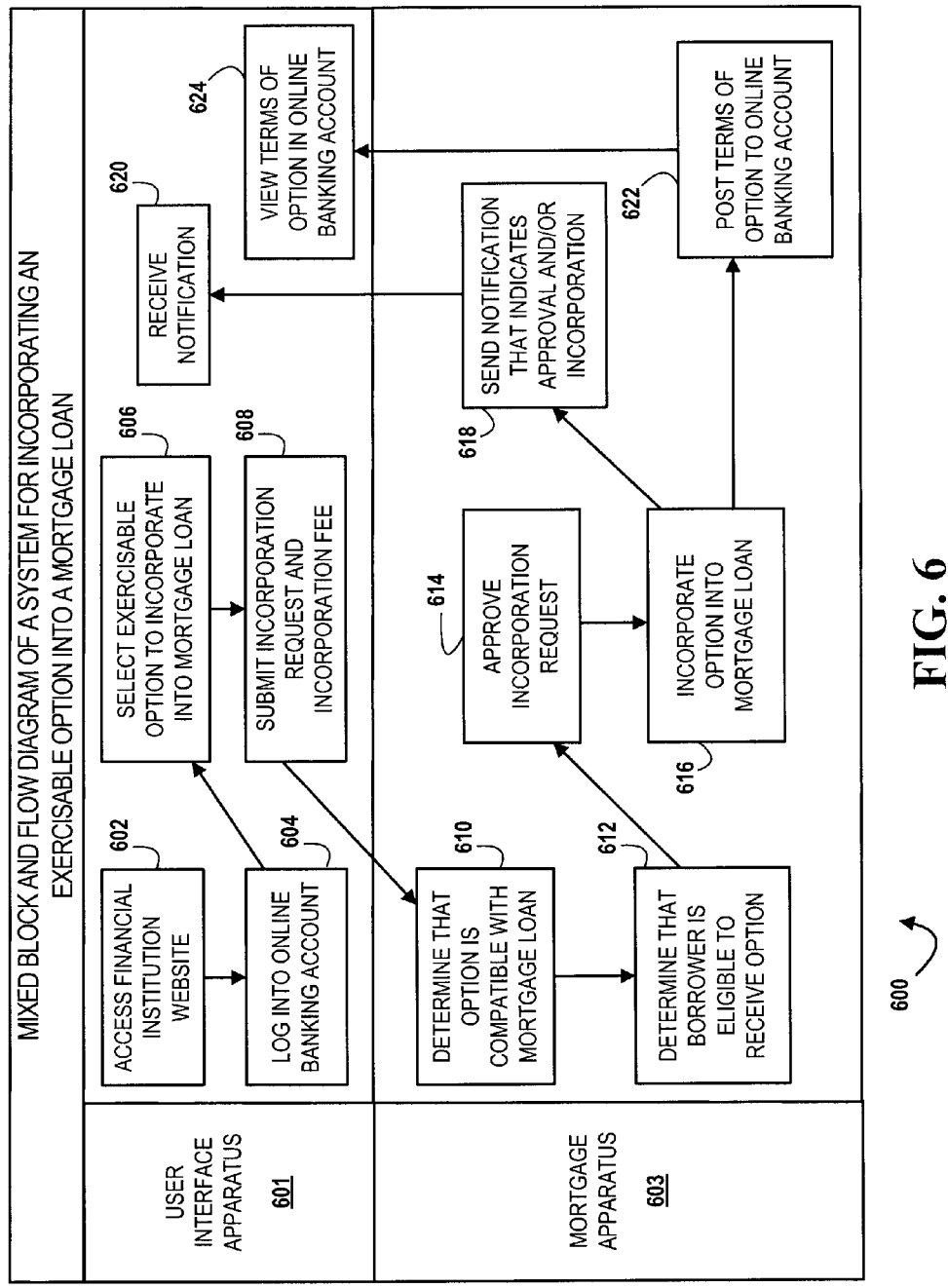

FIG. 3 is a chart illustrating the exercise of an option having an interest rate modification feature, where the interest rate modification feature is based at least partially on the value of a reference interest rate, in accordance with an embodiment of the present invention;

FIG. 4 is a flow diagram illustrating a general process flow of an apparatus for providing, processing, and/or servicing a mortgage loan having an exercisable option, where one or more of the terms of the option are based at least partially on a non-mortgage relationship between a borrower associated with the mortgage loan and a lender associated with the mortgage loan, in accordance with an embodiment of the present invention;

FIG. 5 is a block diagram illustrating a system for providing, processing, and/or servicing a mortgage loan having an exercisable option, in accordance with an embodiment of the present invention; and FIG. 6 is a mixed block and flow diagram of a system for incorporating an exercisable option into a mortgage loan, in accordance with an embodiment of the present invention.

DETAILED DESCRIPTION OF EMBODIMENTS
OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business process, software, and hardware aspects that may generally be referred to herein as a "system." Furthermore, embodiments of the present invention may take the form of a computer program product that includes a computer-readable storage medium having computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory and/or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

In general terms, embodiments of the present invention relate to methods and apparatuses for providing, processing, and/or servicing a mortgage loan having one or more exercisable options. For example, some embodiments of the present invention provide a mortgage loan that includes a fixed interest rate and an exercisable option, such that exercising the option results in the value of the fixed interest rate being modified from a first value to a second value (e.g., where the second value is lower than the first value, where the second value is higher than the first value, etc.). As another example, some embodiments of the present invention provide a mortgage loan having an exercisable option, where one or more terms of the option are based at least partially on a non-mortgage relationship between a borrower associated with the mortgage loan and a lender associated with the mortgage loan.

The term "lender," as used herein, generally refers to the one or more entities that provide, purchase, process, and/or service a mortgage loan. For example, in some embodiments, the lender is an entity that originated and/or provided the mortgage loan to the borrower. In other embodiments, the lender is a secondary mortgage market purchaser, mortgage loan aggregator, mortgage loan investor, and/or some other entity that purchases the mortgage loan from the mortgage loan originator and/or from one or more other entities. In still other embodiments, the lender is an entity that securitizes the mortgage loan. In some embodiments, the lender is an entity responsible for servicing and/or processing the mortgage loan, for example, by producing mortgage loan statements, receiving mortgage loan payments, incorporating exercisable options into mortgage loans, and/or exercising options incorporated into mortgage loans. In some embodiments, if obligations of the mortgage loan have not been met, the lender may repossess (e.g., via recovery, etc.) the property that is used to secure the mortgage loan. In some embodiments, the lender is a mortgagee associated with a mortgage loan.

The term "borrower," as used herein, generally refers to the one or more entities that are responsible for meeting the one or more terms (e.g., the one or more features, functions, operations, rights, responsibilities, privileges, restrictions, and/or obligations, etc.) associated with the mortgage loan. For example, in some embodiments, the borrower refers to the entity responsible for making one or more payments on the mortgage loan. As another example, in some embodiments, the borrower is the entity that originally borrowed the funds associated with the mortgage loan. However, in other embodiments, the borrower is not the original borrower but is instead an assignee, successor, and/or some other entity responsible for meeting the one or more terms associated with the mortgage loan. In some embodiments, the borrower owns and/or lives in the property that is used to secure the mortgage loan. In some embodiments, the borrower is a mortgagor associated with the mortgage loan.

Referring now to FIG. 1, a general process flow 100 of an apparatus for providing, processing, and/or servicing a mortgage loan having an exercisable option is provided, in accordance with an embodiment of the present invention. As represented by the block 110, the apparatus is configured to receive information associated with a mortgage loan. As represented by the block 120, the apparatus is also configured to determine an exercisable option to incorporate into the mortgage loan. In addition, as represented by the block 130, the apparatus is configured to incorporate the option into the mortgage loan. Thereafter, as represented by the block 140, the apparatus is configured to modify, upon exercise of the option, one or more terms of the mortgage loan in accordance with the option.

For simplicity, the portion of the process flow 100 represented by the block 120 is sometimes referred to herein as the "option determination." Also, the term "determine," as used herein, is meant to have its ordinary meaning (i.e., its ordinary dictionary definition) in addition to the one or more ordinary meanings of the following terms: discover, learn, calculate, observe, read, decide, conclude, verify, ascertain, and/or the like.

In addition, it will be understood that the apparatus having the process flow 100 (and/or the process flows 200 and/or 400) can include and/or be embodied as one or more separate and/or different apparatuses. For example, in some embodiments, one apparatus (e.g., the user interface apparatus 520 described in connection with FIG. 5, etc.) is configured to perform the portions of the process flow 100 represented by the blocks 110 and 120, and a second apparatus (e.g., the mortgage apparatus 530 described in connection with FIG. 5, etc.) is configured to perform the portions represented by the blocks 130 and 140. However, in some embodiments, a single apparatus is configured to perform each and every portion of the process flow 100. In addition, in some embodiments, a first portion of an apparatus is configured to perform one or more portions of the process flow 100, and one or more other portions of the same apparatus are configured to perform the one or more other portions of the process flow 100.

Also, it will be understood that one or more of the portions of the process flow 100 can occur after, at, or prior to the closing of the mortgage loan. For example, in some embodiments, the apparatus having the process flow 100 is configured to receive the information associated with the mortgage loan, make the option determination, and incorporate the option into the mortgage loan, all at or prior to the closing of the mortgage loan. In such embodiments, it will be understood that the exercisable option is "built in" to the mortgage loan. In some embodiments, the exercisable option is built in to the mortgage loan as one or more of the predefined, standard, and/or pre-packaged terms of the mortgage loan. In other embodiments, the exercisable option is incorporated into the mortgage loan as an optional term of, and/or as an upgrade to, the mortgage loan.

In some embodiments, the apparatus having the process flow 100 is configured to incorporate the option into the mortgage loan after the closing of the mortgage loan. For example, in some embodiments, the apparatus having the process flow 100 is configured to perform each and every portion of the process flow 100 after the closing of the mortgage loan. Where the option is incorporated into the mortgage loan after the closing, it will be understood that the option is "added on" to the mortgage loan. For example, in some embodiments, a borrower associated with the mortgage loan can pay a fee to a lender associated with the mortgage loan sometime after the closing of the mortgage loan in order to incorporate the exercisable option into the mortgage loan. Accordingly, it will be understood that the exercisable option can be built into or added onto the mortgage loan. In other words, the exercisable option can be incorporated into the mortgage loan at any time. Also, in some embodiments, the exercisable option can only be exercised after the option has been incorporated into the mortgage loan. In other embodiments, the exercisable option can only be exercised during the life of the mortgage loan (e.g., during the mortgage period, the loan term, etc.).

Regarding the block 110, the mortgage loan can include and/or be embodied as any loan secured by property. In some embodiments, the mortgage loan can be secured by personal property (e.g., car, boat, trailer, etc.), intellectual property (e.g., issued patent, patent application, trademark registration, etc.), home equity, stock, and/or some other kind of security interest. In other embodiments, the mortgage loan is secured by real property, which, in some embodiments, includes residential real estate. As such, it will be understood that, in some embodiments, the mortgage loan refers to a home mortgage loan and/or a "home mortgage."

It will be understood that the apparatus having the process flow 100 can be configured to receive any amount and/or type of information associated with the mortgage loan. In addition, the apparatus can also be configured to receive that information in any way and/or at any time. For example, in some embodiments, the apparatus receives the information associated with the mortgage loan during the pre-qualification process, loan application process, pre-approval process, underwriting process, and/or closing process associated with the mortgage loan. In some embodiments, the information associated with the mortgage loan includes one or more terms of the mortgage loan that define the one or more features, functions, operations, rights, responsibilities, privileges, restrictions, and/or obligations associated with the mortgage loan. The one or more terms of the mortgage loan can include, for example, a loan term (e.g., the time until maturity of the mortgage loan, etc.), an interest rate value (e.g., 5.00%, 2.35%, etc.), an interest rate type (e.g., fixed, variable, etc.), a loan payment amount (e.g., $500 per month, etc.), a loan payment frequency (e.g., monthly, biweekly, etc.), a loan payment type (e.g., interest-only, principal plus interest, etc.), and/or the like.

Further regarding the block 110, in some embodiments, the information associated with the mortgage loan includes information associated with a borrower that is associated with the mortgage loan. For example, in some embodiments, the information associated with the mortgage loan includes information associated with the borrower's income, assets, liabilities, credit score, loan-to-value ratio, and/or the like. It will also be understood that, in some embodiments, the information associated with the mortgage loan includes information that is associated with a lender (e.g., where the lender is associated with the mortgage loan, etc.). In other embodiments, the information associated with the mortgage loan additionally or alternatively includes information associated with a loan application (e.g., the borrower's loan application that is associated with the mortgage loan, etc.). As still another example, in some embodiments, the information associated with the mortgage loan includes information associated with an exercisable option. It will be understood that, in some embodiments, the exercisable option is included and/or embodied as one or more terms of the mortgage loan. Further, in some embodiments, the information associated with the mortgage loan includes a request to incorporate an exercisable option into the mortgage loan, which is, in some embodiments, included formally, informally, implicitly, and/or explicitly in a mortgage loan application (e.g., the borrower's loan application, etc.).

Regarding the block 120, the phrase "exercisable option," as used herein, refers to an option that can be incorporated into a mortgage loan and exercised during the life of the mortgage loan (e.g., loan term, mortgage period, etc.) to temporarily or permanently modify one or more of the terms of the mortgage loan. It will be understood that, in some embodiments, the option holder has the right, but not the obligation, to exercise the option. It will also be understood that the option holder may be a borrower associated with the mortgage loan, a lender associated with the mortgage loan, an assignee of the mortgage loan, and/or one or more other entities having control over the exercise and/or incorporation of the option.

In some embodiments, exercising the option results in the temporary or permanent modification of the interest rate value, interest rate type, loan term, amortization term, number of loan payments, loan payment amount, loan payment type, loan payment frequency, and/or one or more other terms of the mortgage loan. For example, in some embodiments, as described in more detail herein in connection with FIG. 2, a mortgage loan includes a fixed interest rate and an exercisable option, where the option has an interest rate modification feature, such that exercising the option results in the value of the fixed interest rate being modified from a first value to a second value (e.g., from 7.25% to 6.50%, etc.). As another example, in some embodiments, a mortgage loan includes an exercisable option having a loan term modification feature, such that exercising the option results in the loan term of the mortgage loan being modified from a first length to a second length (e.g., from a total of 360 months to 400 months, etc.). In some of these embodiments, exercising the option having the loan term modification feature also results in modifying the loan payment amount (e.g., reducing the loan payment amount, etc.) and/or modifying the number of loan payments (e.g., increasing the number of payments, etc.). As still another example, in some embodiments, a mortgage loan includes a fixed interest rate and an exercisable option, where the option includes an interest rate type modification feature, such that exercising the option results in the fixed interest rate of the mortgage loan being modified to a variable interest rate (or vice versa).

As a further example, in some embodiments, a mortgage loan includes an exercisable option having a loan payment type modification feature, such that exercising the option results in the loan payment type for the mortgage loan being modified from a composite type (e.g., the loan payment includes the sum of the monthly principal, interest, mortgage insurance, and/or taxes associated with the mortgage loan, etc.) to an interest-only type (e.g., the payment includes only the monthly interest associated with the mortgage loan, etc.). As still another example, in some embodiments, a mortgage loan includes an exercisable option having a loan payment amount modification feature, such that exercising the option results in a loan payment amount of the mortgage loan being modified from a first amount to a second amount (e.g., where the second amount is lower than the first amount, etc.). It will be understood that an exercisable option may include one or more exercisable options and/or one or more features.

It will also be understood that, in accordance with some embodiments, the exercisable option includes one or more terms that define the one or more features, functions, operations, rights, responsibilities, privileges, restrictions, and/or obligations associated with the exercisable option. The one or more terms of the option may relate to, for example, the features included in the option, the result that occurs when the option is exercised, the number of times the option may be exercised, the frequency with which the option may be exercised, the time period in which the option may be exercised, the way in which the option may be exercised, a fee associated with incorporating the option into the mortgage loan, a fee associated with exercising the option, and/or the like.

For example, in some embodiments, the exercisable option includes one or more terms that specify that the option may be exercised only by a borrower associated with the mortgage loan, and/or that the option gives the borrower the right, but not the obligation, to exercise the option. However, in other embodiments, the one or more terms of the option additionally or alternatively specify that the option can (or shall) be exercised by a lender associated with the mortgage loan, by the apparatus having the process flow 100 (and/or 200, 400, 600, etc.), and/or by one or more other entities and/or apparatuses. Also, in some embodiments, the apparatus having the process flow 100 is configured to automatically (i.e., without human intervention) exercise the option upon or after one or more triggering events. (For simplicity, the phrase "upon or after" is sometimes collectively referred to herein as "upon.") In some embodiments, these triggering events are defined by the one or more terms of the option and/or by the one or more terms of the mortgage loan.

Further regarding the block 120, the apparatus having the process flow 100 can be configured to make the option determination based at least partially on determining that the mortgage loan (and/or a borrower associated with that mortgage loan) is eligible to receive the exercisable option, as explained in more detail herein in connection with FIG. 2. Additionally or alternatively, in some embodiments, the apparatus is configured to make the option determination based at least partially on a non-mortgage relationship between a borrower associated with the mortgage loan and a lender associated with the mortgage loan, which is also explained in more detail herein in connection with FIG. 4. Further, in some embodiments, the apparatus having the process flow 100 is configured to make the option determination based at least partially on receiving a request (e.g., from the borrower, from the lender, etc.) to incorporate the option into the mortgage loan. In other embodiments, the apparatus is configured to automatically make the option determination immediately or nearly immediately after receiving the information associated with the mortgage loan.

Regarding block 130, the apparatus having the process flow 100 can be configured to incorporate the option into the mortgage loan in any way and at any time (e.g., before, at, or prior to closing, etc.). In some embodiments, the apparatus is configured to incorporate the option into the mortgage loan by storing the one or more terms of the mortgage loan and/or the one or more terms of the option in memory (e.g., a non-transitory computer-readable medium, etc.), so that, for example, the mortgage loan may be provided, processed, and/or serviced accordingly. For example, in some embodiments, the apparatus is configured to incorporate the option into the mortgage loan by posting one or more terms of the option to an online banking account (e.g., accessible by the borrower, lender, etc.).

In some embodiments, the apparatus is configured to automatically incorporate the option into the mortgage loan immediately or nearly immediately after making the option determination. Also, in some embodiments, the apparatus is configured to incorporate the option into the mortgage loan based at least partially on a fee paid prior to, after, or simultaneous with incorporating the option into the mortgage loan. For example, in some embodiments, the borrower must pay an "incorporation fee" to the lender in order to incorporate the option into the mortgage loan.

Regarding the block 140, the apparatus having the process flow 100 can be configured to modify, upon exercise of the option, the one or more terms of the mortgage loan at any time and/or in any way. In some embodiments, the apparatus is configured to modify the one or more terms of the mortgage loan immediately or nearly immediately after the exercise of the option, whereas in other embodiments, the apparatus is configured to modify the one or more terms of the mortgage loan sometime after the exercise of the option (e.g., one business day after the exercise, etc.). Additionally or alternatively, in some embodiments, the apparatus is configured to modify the one or more terms of the mortgage loan based at least partially on a fee paid prior to, after, or simultaneous with the exercise of the option. For example, in some embodiments, the borrower must pay an "exercise fee" to the lender in order to exercise the option. In some embodiments, the borrower must pay this exercise fee in addition to paying an incorporation fee.

Further regarding the block 140, in some embodiments, the apparatus is configured to modify the one or more terms of the mortgage loan upon exercising the option itself. For example, in some embodiments, as explained in more detail herein, the apparatus is configured to automatically exercise the option and modify the one or more terms of the mortgage loan once the value of a reference rate moves relative to (e.g., falls to or below, etc.) a predetermined value. As another example, in some embodiments, the apparatus is configured to exercise the option upon or after receiving a request to exercise the option (e.g., from a borrower, lender, loan officer, underwriter, and/or some other entity associated with the mortgage loan, etc.). It will also be understood that the apparatus can be additionally or alternatively configured to modify the one or more terms of the mortgage loan in response to the option being exercised by one or more other apparatuses and/or entities. For example, in some embodiments, the apparatus is configured to modify the one or more terms of the mortgage loan based at least partially on receiving a notification from a second apparatus, where the notification indicates that the option has been exercised by that second apparatus and/or by a borrower associated with the mortgage loan. It will also be understood that the apparatus having the process flow 100 can condition exercise of the option and/or modification of the mortgage loan terms on one or more conditions, such as, for example, whether the mortgage loan is in good standing, whether the borrower's non-mortgage accounts are in good standing, whether the borrower's credit score is satisfactory, and/or the like.

It will be understood that the apparatus having the process flow 100 can be configured to perform any one or more portions of the process flow 100 represented by the blocks 110-140 upon or after one or more triggering events (which, in some embodiments, is one or more of the other portions of the process flow 100). As used herein, a "triggering event" refers to an event that automatically triggers the execution, performance, and/or implementation of a triggered action, either immediately, nearly immediately (i.e., within minutes), or sometime after the occurrence of the triggering event. For example, in some embodiments, the apparatus having the process flow 100 is configured such that the apparatus receiving the information associated with the mortgage loan (the triggering event) automatically and immediately or nearly immediately triggers the apparatus to make the option determination (the triggered action). In some embodiments, the apparatus having the process flow 100 is additionally or alternatively configured to automatically incorporate the exercisable option into the mortgage loan (triggered action) sometime after (e.g., four hours after, two days after, etc.) making the option determination (triggering event). Also, in some embodiments, the apparatus having the process flow 100 is configured to automatically modify the one or more terms of the mortgage loan in accordance with the option (triggered action) immediately or nearly immediately after determining that the option has been exercised (triggering event).

In some embodiments, a predetermined time and/or the passage of a predetermined period of time may serve to trigger one or more of the portions represented by the blocks 110-140. Further, in some embodiments, the apparatus having the process flow 100 is configured to automatically perform one or more (or all) of the portions of the process flow 100 represented by the blocks 110-140. However, in other embodiments, one or more (or all) of the portions of the process flow 100 represented by the blocks 110-140 require and/or involve at least some human intervention (e.g., some embodiments require a user to operate the apparatus having the process flow 100, etc.). In some embodiments, the process flow 100 is performed without using any apparatus at all. In other words, in some embodiments, the process flow 100 represents the process flow of a "pure" business method that is performed, for example, by one or more employees (e.g., loan officers, underwriters, bank employees, etc.) associated with the mortgage provider, processor, and/or servicer (e.g., the lender, a secondary mortgage market purchaser, etc.). It will be understood that, in addition to the process flow 100, any of the embodiments described and/or contemplated herein can involve one or more triggering events, triggered actions, automatic actions, apparatus actions, and/or human actions. It will also be understood that any of the embodiments described and/or contemplated herein can be embodied, where possible, as pure business methods.

Further, in some embodiments, the apparatus having the process flow 100 is configured to perform one or more (or all) of the portions of the process flow 100, individually or collectively, within moments, seconds, and/or minutes (e.g., within approximately 1-45 minutes, etc.). In some embodiments, the apparatus having the process flow 100 can be configured to perform one or more portions of the process flow 100 in real time, in substantially real time, and/or at one or more predetermined times. Further, it will be understood that the number, order, and/or content of the portions of the process flow 100 are exemplary and may vary.

It will also be understood that the process flow 100 (like all of the other process flows described herein) can include one or more additional or alternative process flow portions, and/or that the apparatus having the process flow 100 can be configured to perform one or more additional or alternative functions. For example, in some embodiments, the apparatus having the process flow 100 is configured to exercise the option and/or determine that the option has been exercised. As another example, in some embodiments, the apparatus is configured to charge a fee (e.g., an incorporation fee, an exercise fee, etc.) based at least partially on performing any one or more portions of the process flow 100.

As a further example, in some embodiments, the process flow 100 includes providing the mortgage loan and/or the option to the borrower. This providing portion can be performed by one or more persons (e.g., loan officer, underwriter, etc.) and/or by the apparatus having the process flow 100. As an example, in some embodiments, the apparatus having the process flow 100 is configured to provide the mortgage loan and/or the option to the borrower by storing the one or more terms of the mortgage loan and/or the one or more terms of the option in memory, so that, for example, the mortgage loan may be provided, processed, and/or serviced accordingly. Of course, it will also be understood that the apparatus having the process flow 100 can be configured to perform any one or more portions of any one or more embodiments described and/or contemplated herein, including, for example, any one or more portions of the process flows 200 and/or 400 described later herein.

Referring now to FIG. 2, a general process flow 200 of an apparatus for providing, processing, and/or servicing a mortgage loan having an exercisable option is provided, where the option includes an interest rate modification feature, in accordance with an embodiment of the present invention. As represented by the block 210, the apparatus is configured to receive a request to incorporate an exercisable option into a mortgage loan, where the mortgage loan includes a fixed interest rate, and where the option includes an interest rate modification feature, such that exercising the option results in the value of the fixed interest rate being modified from a first value to a second value. As represented by the block 220, the apparatus is also configured to determine that the mortgage loan and/or a borrower associated with the mortgage loan are eligible to receive the option. As represented by the block 230, the apparatus is further configured to store one or more terms of the option and/or one or more terms of the mortgage loan in memory. Then, as represented by the block 240, the apparatus having the process flow 200 is configured to modify, upon exercise of the option, the value of the fixed interest rate from the first value to the second value. For simplicity, the portion of the process flow 200 represented by the block 220 is sometimes referred to herein as the "eligibility determination," and the request referred to in the block 210 is sometimes referred to herein as the "incorporation request."

Regarding the block 210, the incorporation request may be received at any time, may be submitted by any device (e.g., personal computer, workstation computer, mobile phone, automated teller machine (ATM), etc.), may be submitted by any entity (e.g., the borrower, the lender, etc.), and may include and/or be embodied as a formal, informal, explicit, implicit, and/or any other kind of request. For example, in some embodiments where the exercisable option is built into the mortgage loan at or prior to the closing of the mortgage loan, the apparatus having the process flow 200 is configured to receive the incorporation request by receiving the borrower's application for the mortgage loan, where the application includes the one or more terms of the exercisable option implicitly or explicitly therein. As another example, in some embodiments where the exercisable option is added onto the mortgage loan after the closing of the mortgage loan, the apparatus is configured to receive the incorporation request from the borrower via, for example, a financial institution website and/or an online banking account (e.g., mobile banking account, online mortgage account, online banking account, etc.) associated with the borrower.

Regarding the block 220, the apparatus having the process flow 200 can be configured to make the eligibility determination based on any information and/or in any way. In some embodiments, the apparatus having the process flow 200 is configured to make the eligibility determination based at least partially on information associated with the borrower. For example, in some embodiments, the apparatus is configured to compare information associated with the borrower's income, assets, liabilities, credit score, loan-to-value ratio, and/or the like to one or more rules, regulations, and/or requirements (e.g., set by the lender, set by a secondary mortgage market purchaser, set by Fannie Mae® and/or Freddie Mac®, set by a local, state, federal, and/or national government, etc.). In such embodiments, if the information associated with the borrower complies with the one or more rules, regulations, and/or requirements, then the apparatus is configured to determine that the borrower is eligible to receive the option. As another example, in some embodiments, the apparatus having the process flow 200 is configured to make the eligibility determination based at least partially on a non-mortgage relationship between a borrower associated with the mortgage loan and a lender associated with the mortgage loan, as described in more detail herein in connection with FIG. 4.

In some embodiments, the apparatus having the process flow 200 is additionally or alternatively configured to make the eligibility determination based at least partially on determining that (and/or whether) the mortgage loan is eligible to receive the exercisable option. In other words, in some embodiments, the apparatus is configured to determine that (and/or whether) the one or more terms of the mortgage loan are compatible with the one or more terms of the requested exercisable option. For example, in some embodiments, the apparatus is configured to determine that the mortgage loan is eligible based at least partially on determining that the mortgage loan includes a fixed interest rate and the exercisable option is designed to modify the value of a fixed interest rate. Of course, it will be understood that, in alternative embodiments, the apparatus is configured to make the eligibility determination based at least partially on information associated with the borrower, the lender, one or more terms of the mortgage loan, one or more terms of the option, a loan application (e.g., the borrower's loan application, etc.), an incorporation fee, an exercise fee, and/or the like.

Regarding the block 230, the apparatus having the process flow 200 can be configured to store one or more terms of the mortgage loan and/or one or more terms of the option in memory in any way and/or at any time (e.g., before, at, or prior to closing, etc.). In some embodiments, the apparatus is configured to incorporate the option into the mortgage loan by storing, in memory, one or more terms of the mortgage loan and/or one or more terms of the option. Additionally or alternatively, the apparatus can be configured to store those terms in memory so that, for example, the mortgage loan may be provided, processed, and/or serviced accordingly. In other embodiments, the apparatus is additionally or alternatively configured to approve the request referred to in the block 210 by storing one or more terms of the mortgage loan and/or one or more terms of the option in memory.

Regarding the block 240, the apparatus having the process flow 200 can be configured to modify the value of the fixed interest rate from the first value to the second value at the time the option is exercised and/or at any time thereafter. In some embodiments, the second value of the fixed interest rate is lower than the first value of the fixed interest rate. For example, in some embodiments, the value of the fixed interest rate prior to the modification is 6.00% (i.e., the first value), and the value of the fixed interest rate after and/or as a result of the modification is 4.50% (i.e., the second value). However, in other embodiments, the second value of the fixed interest rate is higher than the first value of the fixed interest rate. For example, in some embodiments, the value of the fixed interest rate prior to the modification is 4.75% (i.e., the first value), and the value of the fixed interest rate after and/or as a result of the modification is 6.25% (i.e., the second value). In some embodiments, the first value of the fixed interest rate is the value of the fixed interest rate immediately after the closing of the mortgage loan.

In some embodiments of the present invention, the modification of the value of the fixed interest rate is a permanent modification, i.e., the value of the fixed interest rate remains fixed at the second value until the maturity, extinguishment, non-payment of obligations, and/or recovery of the mortgage loan. However, in other embodiments, the modification of the value of the fixed interest rate is temporary, meaning that the option may be exercised again to modify the value of the fixed interest rate from the second value to a third value, from the third value to a fourth value, and so on. However, in such embodiments, the type of the interest rate associated with the mortgage loan is a fixed interest rate and is not a variable and/or adjustable interest rate. In other words, the value of the fixed interest rate is fixed over the life of the mortgage loan unless the value of that fixed interest rate is modified by exercising one or more exercisable options associated with the mortgage loan. However, it will be understood that the fixed interest rate is not infinitely adjustable and/or cannot be continuously and/or continually adjusted. Instead, only a finite number of modifications to the value of the fixed interest rate as a result of exercising one or more exercisable options are possible. For example, in some embodiments, the option is exercisable only once and the option extinguishes after its exercise. As another example, in some embodiments, the option is exercisable only twice and the option extinguishes after those two exercises.

Further regarding the block 240, in some embodiments, the second value of the fixed interest rate is based at least partially on a fee paid by the borrower before, after, or simultaneous with exercising the option and/or modifying the value of the fixed interest rate. For example, in some embodiments, the borrower can pay an incorporation fee and/or exercise fee so that the second value of the fixed interest rate is lower than the first value (e.g., the first value is 5.50%, and the borrower may pay a $1,000 fee for a second value of 4.75%, etc.). As another example, in some embodiments, the second value of the fixed interest rate is based at least partially on the amount of the incorporation fee and/or exercise fee paid by the borrower (e.g., the borrower may pay a $1,000 fee for second value of 4.25%, or the borrower may pay a $2,000 fee for a second value of 4.00%, etc.). As still another example, in some embodiments, the borrower must pay an incorporation and/or exercise fee for the second value of the fixed interest rate to be lower than the first value, i.e., the borrower can avoid paying a fee but the second value will be higher than the first value (e.g., the first value is 6.25%, and the borrower may pay a $1,000 fee for a second value of 6.00%, but if the borrower does not pay the fee, the second value will be 6.50%, etc.).

Additionally or alternatively, in some embodiments, the second value of the fixed interest rate is based at least partially on a non-mortgage relationship between a borrower associated with the mortgage loan and a lender associated with the mortgage loan, as discussed in more detail herein in connection with FIG. 4. Also, in some embodiments, the first value of the fixed interest rate is based at least partially on a fee (e.g., an incorporation fee, exercise fee, fee paid by the borrower, etc.), and in other embodiments, the first value of the fixed interest rate is additionally or alternatively based at least partially on a non-mortgage relationship.

Further, in some embodiments, the second value of the fixed interest rate is based at least partially on the value of a reference rate. For example, in some embodiments, the reference rate refers to the London Interbank Offered Rate (LIBOR), Cost of Funds Index (COFI), average mortgage interest rate for a predefined area (e.g., the U.S. national average mortgage interest rate, the average mortgage interest rate in North Carolina, the average mortgage interest rate in Europe, etc.), and/or one or more other reference rates. In some embodiments, the reference rate includes and/or is embodied as an interest rate. In some embodiments, the reference rate refers to a publicly-accessible rate that is commonly used by financial institutions to set interest rate values for mortgage loans. Additionally or alternatively, in some embodiments, the reference rate refers to a rate over which neither the borrower, the lender, nor any other entity associated with the mortgage loan has the power to manipulate. However, in other embodiments, the reference rate refers to the interest rate value offered by the lender (e.g., the mortgage interest rate value that the lender currently offers to the lender's customers, etc.) and/or by one or more other lenders.

In some embodiments, the option is exercisable upon or after the value of the reference rate moves relative to a predetermined value. For example, in some embodiments, the option may be exercised once the value of the reference rate moves relative to 5.00% (e.g., moves past 5.00%, rises to or above 5.00%, falls to or below 5.00%, etc.). It will be understood that, in some embodiments, the reference rate and/or the predetermined value are determined at or prior to the exercise of the option, at or prior to the option being incorporated into the mortgage loan, and/or at or prior to the closing of the mortgage loan. Additionally or alternatively, in some embodiments, the reference rate and/or the predetermined value are agreed upon by the borrower and the lender. It will also be understood that, in some embodiments, the apparatus having the process flow 200 is configured to automatically exercise the option once the value of the reference rate moves relative to the predetermined value.

As a more-detailed example, FIG. 3 provides an exemplary chart 300 that illustrates the movement of the value of a fixed interest rate of a mortgage loan 308 and the movement of the value of a reference interest rate 306 over the same eleven month period of time, in accordance with an embodiment of the present invention. In this example embodiment, the mortgage loan includes a fixed interest rate 308 having a value of 6.25% (i.e., the value of the fixed interest rate immediately after closing) and an exercisable option having an interest rate modification feature. Also, in this example embodiment, one or more terms of the option specify that exercising the option results in the value of the fixed interest rate 308 being modified from 6.25% (i.e., the first value) to 5.00% (i.e., the second value). In addition, in this example embodiment, one or more terms of the option specify that the option can be exercised only once, after which the option is extinguished. Still further, one or more terms of the option specify that the option shall be automatically exercised (e.g., by the apparatus having the process flow 200, by the borrower, etc.) once the value of the reference interest rate 306 falls to or below 5.00% (i.e., the predetermined value). Accordingly, the option in this embodiment is sometimes called an "automatic interest rate float down" option because the option: (a) is exercised automatically; (b) is exercised once the value of a reference rate falls to or below a predetermined value; and (c) modifies, upon exercise of the option, the value of a fixed interest rate of a mortgage loan from a first value to a second, lower value.

As indicated by the interest rate y-axis 302 and the mortgage period x-axis 304, the value of the fixed interest rate of the mortgage loan 308 from July to January of the mortgage period remained fixed at 6.25%. The value of the reference interest rate 306 over the same period of time changed frequently and moved between approximately 6.75% at the beginning of July to a little over 5.00% at the beginning of January. In January at the point 310, the value of the fixed interest rate 308 was modified from 6.25% (i.e., the first value) to 5.00% (i.e., the second value) when the value of the reference interest rate 306 fell to (and below) 5.00% (i.e., the predetermined value). After the point 310, the value of the fixed interest rate 308 remained fixed at 5.00% (and will remain fixed at 5.00% until the loan matures, is extinguished, etc.), and the value of the reference interest rate 306 fell below 5.00% in January and then climbed back above 6.25% in May.

Referring now to FIG. 4, a general process flow 400 of an apparatus for providing, processing, and/or servicing a mortgage loan is provided, where one or more terms of the option are based at least partially on a non-mortgage relationship between a borrower associated with the mortgage loan and a lender associated with the mortgage loan, in accordance with an embodiment of the present invention. As represented by the block 110, the apparatus having the process flow 400, like the apparatus having the process flow 100, is configured to receive information associated with a mortgage loan. As represented by the block 420, the apparatus having the process flow 400 is also configured to determine a non-mortgage relationship between a borrower associated with the mortgage loan and a lender associated with the mortgage loan. As represented by the block 430, the apparatus is further configured to determine an exercisable option to incorporate into the mortgage loan, where one or more terms of the option are based at least partially on the non-mortgage relationship. Also, like the apparatus having the process flow 200, the apparatus having the process flow 400 is configured to store one or more terms of the option and/or one or more terms of the mortgage loan in memory, as represented by the block 230 shown in FIG. 4. In addition, like the apparatus having the process flow 100, the apparatus having the process flow 400 is configured to modify, upon exercise of the option, one or more terms of the mortgage loan in accordance with the option, as represented by the block 140 shown in FIG. 4.

Regarding the block 420, the apparatus having the process flow 400 can be configured to determine the non-mortgage relationship at any time and in any way. In some embodiments, the apparatus having the process flow 400 is configured to determine the non-mortgage relationship by receiving and/or collecting information associated with the non-mortgage relationship (e.g., from a datastore, from the borrower, from the information associated with the mortgage loan, etc.). In some embodiments, the apparatus is configured to determine the non-mortgage relationship based at least partially on receiving and/or collecting information associated with: how long the borrower has been a customer of the lender; the length of time that one or more non-mortgage accounts associated with the borrower have been held, serviced, controlled, and/or maintained (collectively referred to herein as "maintained" for simplicity) by the lender; the value of one or more non-mortgage accounts associated with the borrower and maintained by the lender; and/or the like.

In some embodiments, the apparatus having the process flow 400 is configured to determine the non-mortgage relationship by determining the "relative strength" of the non-mortgage relationship. In some embodiments, the apparatus is configured to determine the relative strength of the non-mortgage relationship based at least partially on one or more rules (e.g., set by the lender, etc.). Also, in some embodiments, the apparatus is configured to assign the non-mortgage relationship one or more identifiers that indicate the relative strength of the non-mortgage relationship, such as, for example, "not applicable," "weak," "average," "strong," and/or "very strong". For example, in some embodiments, the apparatus having the process flow 400 is configured to determine that the non-mortgage relationship between the borrower and the lender is "strong" based at least partially on determining that the borrower has been a non-mortgage customer of the lender for ten or more years. As another example, in some embodiments, the apparatus is configured to determine that the non-mortgage relationship between the borrower and the lender is "not applicable" based at least partially on determining that the lender does not maintain any non-mortgage accounts for the benefit of the borrower (e.g., where the borrower's only interaction with the lender is through the mortgage loan, etc.).

Regarding the block 430, the exercisable option can include and/or be embodied as any one or more of the exercisable options described and/or contemplated herein. Also, in accordance with some embodiments, one or more terms of the option are based at least partially on the non-mortgage relationship between a borrower and a lender. For example, in some embodiments, the exercisable option includes the interest rate modification feature described in connection with FIG. 2, where the second value is based at least partially on the non-mortgage relationship (e.g., the second value is 4.75% if the borrower's one or more non-mortgage accounts maintained by the lender total at least $25,000, or the second value is 4.50% if the borrower's one or more non-mortgage accounts total at least $50,000, etc.). As another example, in some embodiments, the exercisable option includes a term modification feature, such that exercising the option results in the term of the mortgage loan being extended, and where the length of the extension is based at least partially on the non-mortgage relationship (e.g., the length of the extension is 40 months if the borrower has been a customer of the lender for at least 5 years, or the length of the extension is 100 months if the borrower has been a customer of the lender for at least 10 years, etc.).

As still another example, in some embodiments, the exercisable option includes a payment amount modification feature, such that exercising the option results in a payment amount associated with the mortgage loan being modified from a composite amount to an interest-only amount, but only if, for example, the apparatus determines that the non-mortgage relationship is "strong" or "very strong." As a further example, in some embodiments, the exercisable option includes a loan payment amount modification feature, such that exercising the option results in the loan payment amount associated with the mortgage loan being modified from a first amount to a second amount, where the second amount is based at least partially on the non-mortgage relationship (e.g., the second amount is $100 less per month if the non-mortgage relationship is "average," or the second amount is $500 less per month if the non-mortgage relationship is "strong," etc.). In some embodiments, the non-mortgage relationship can affect one or more other terms of the option, including, for example, the number of times the option can be exercised, the frequency with which the option can be exercised, the period of time in which the option can be exercised, when the option can be exercised, the fee required to exercise the option, and/or the like. For example, in some embodiments, the option can be exercised twice if the non-mortgage relationship is "average," or the option can be exercised three times if the non-mortgage relationship is "strong."

In some embodiments, the non-mortgage relationship additionally or alternatively affects whether the option can be incorporated into the mortgage loan at all. In other words, in some embodiments, the eligibility determination described in connection with FIG. 2 is based at least partially on the non-mortgage relationship. For example, in some embodiments, the apparatus is configured to reject a request to incorporate an exercisable option into a mortgage loan if the apparatus determines that the non-mortgage relationship is "weak" or "non-applicable." As another example, in some embodiments, the apparatus having the process flow 400 is configured to incorporate an exercisable option into a mortgage loan only if the apparatus determines that the borrower has a total non-mortgage account value of $50,000 or more. Also, in some embodiments, the non-mortgage relationship affects the amount of the fee required to incorporate the option into the mortgage loan and/or the amount of the fee required to exercise the option. For example, in some embodiments, the incorporation fee associated with an option is $5,000 if the borrower has less than $10,000 in total non-mortgage account value with the lender, or the incorporation fee is $1,000 if the borrower has at least $10,000 in total non-mortgage account value.

Referring now to FIG. 5, a system 500 for providing, processing, and/or servicing a mortgage loan having an exercisable option is provided, in accordance with an embodiment of the present invention. As illustrated, the exemplary system 500 includes a network 510, a user interface apparatus 520, and a mortgage apparatus 530. Also shown are a mortgage loan 507 having an exercisable option 509 and a mortgage loan borrower 505 associated with the mortgage loan 507. It will be understood that the borrower 505 has access to the user interface apparatus 520 and that the mortgage loan 507 is provided to the borrower 505 by a lender (not shown). Also, in this example embodiment, the mortgage apparatus 530 is maintained by the same lender that provides, purchases, processes, and/or services the mortgage loan 509. It will also be understood that the exercisable option 509 and the mortgage loan 507 can have any of the one or more of the terms and/or features described and/or contemplated herein.

As shown in FIG. 5, the user interface apparatus 520 and the mortgage apparatus 530 are each operatively and selectively connected to the network 510, which may include one or more separate networks. In addition, the network 510 may include one or more interbank networks, telephone networks, telecommunication networks, local area networks (LANs), wide area networks (WANs), and/or global area networks (GANs) (e.g., the Internet, etc.). It will also be understood that the network 510 may be secure and/or unsecure and may also include wireless and/or wireline technology.

The user interface apparatus 520 may include any computerized apparatus that can be configured to perform any one or more of the functions of the user interface apparatus 520 described and/or contemplated herein. It will also be understood that the user interface apparatus 520 can include and/or be embodied as any user interface apparatus described and/or contemplated herein. In some embodiments, for example, the user interface apparatus 520 includes and/or is embodied as a computer (e.g., personal computer, tablet computer, workstation computer (e.g., for a loan officer, underwriter, etc.), etc.), a mobile phone (e.g., smart phone, feature phone, etc.), a network-connected media device (e.g., MP3 player, iPod®, iPod® Touch, etc.), a personal digital assistant (PDA), a gaming console (e.g., Wii®, PlayStation® 3, Xbox®, etc.), an automated teller machine (ATM), a self-service machine (e.g., a kiosk for making mortgage loan payments, etc.), a network device, a front end system, a back end system, and/or the like. In some embodiments, the user interface apparatus 520 is owned, possessed, carried, and/or maintained by the mortgage loan borrower 505. As illustrated in FIG. 5, in this example embodiment, the user interface apparatus 520 includes a communication interface 522, a processor 524, a memory 526 having a browser application 527 stored therein, and a user interface 529. Also, in this example embodiment, the processor 524 is operatively and selectively connected to the communication interface 522, the user interface 529, and the memory 526.

Each communication interface described herein, including the communication interface 522, generally includes hardware, and, in some instances, software, that enables a portion of the system 500, such as the user interface apparatus 520, to send, receive, and/or otherwise communicate information to and/or from the communication interface of one or more other portions of the system 500. For example, the communication interface 522 of the user interface apparatus 520 may include a modem, network interface controller (NIC), network adapter, network interface card, and/or some other electronic communication device that operatively connects the user interface apparatus 520 to another portion of the system 500, such as, for example, the mortgage apparatus 530.

Each processor described herein, including the processor 524, generally includes circuitry for implementing the audio, visual, and/or logic functions of that portion of the system 500. For example, the processor may include a digital signal processor device, a microprocessor device, and/or various analog-to-digital converters, digital-to-analog converters, and/or other support circuits. Control and signal processing functions of the apparatus in which the processor resides may be allocated between these one or more devices according to their respective capabilities. The processor may also include functionality to operate one or more software programs based at least partially on computer-executable program code portions thereof, which may be stored, for example, in a memory device (e.g., the browser application 527 stored in the memory 526 of the user interface apparatus 520, etc.).

Each memory device described herein, including the memory 526 for storing the browser application 527 and other information, may include any transitory or non-transitory computer-readable medium. For example, the memory may include volatile memory, such as volatile random access memory (RAM) having a cache area for the temporary storage of data. The memory may also include non-volatile memory, which may be embedded and/or may be removable. The non-volatile memory may additionally or alternatively include an EEPROM, flash memory, and/or the like. The memory may store any one or more portions of information used by the apparatus in which it resides to implement the one or more functions of that apparatus.

As shown in FIG. 5, the memory 526 includes the browser application 527. It will be understood that the browser application 527 can be operable to initiate, perform, complete, and/or otherwise facilitate any portion of any embodiment described and/or contemplated herein, such as, for example, one or more of the portions of the process flows 100, 200, and/or 400 described herein. In some embodiments, the browser application 527 includes a web browser and/or some other application for communicating with, navigating, controlling, configuring, and/or using the mortgage apparatus 530, the mortgage application 537, and/or one or more other portions of the system 500. For example, in some embodiments, the browser application 527 is operable to load web pages, navigate web sites, and/or communicate with the mortgage apparatus 530 so that the borrower 505 can, for example, select a mortgage loan (e.g., the mortgage loan 507, etc.) from among a plurality of mortgage loans, and/or select one or more exercisable options (e.g., the option 509, etc.) from among a plurality of options to incorporate into the mortgage loan.

As another example, in some embodiments, the browser application 527 is operable to send, to the mortgage apparatus 530, a request to incorporate an exercisable option into a mortgage loan. As still another example, in some embodiments, the borrower 505 can use the browser application 527 to exercise an exercisable option and/or to send a request to the mortgage apparatus 530 to exercise an exercisable option. As a further example, in some embodiments, the borrower 505 can use the browser application 527 to make a loan payment, pay an incorporation fee, pay an exercise fee, and/or pay one or more other fees and/or make one or more other payments associated with the mortgage loan. As such, it will be understood that, in accordance with some embodiments, the browser application 527 is operable to perform any one or more of the functions described herein as being performed by "an apparatus," by the user interface apparatus 520, and/or by the browser application 527.

In some embodiments, the borrower 505 can use the browser application 527 to access an online and/or mobile banking account (not shown) for communicating with the mortgage apparatus 530 and/or one or more other portions of the system 500. Additionally or alternatively, in some embodiments, the browser application 527 is created, provided, controlled, and/or maintained by the mortgage lender that maintains the mortgage apparatus 530 and/or by an individual or business (not shown). For example, in some embodiments, the user interface apparatus 520 is embodied as an iPhone®, and the browser application 527 is embodied as an "app" that was created by the mortgage lender and/or by a software maker for execution on the iPhone®. As another example, in some embodiments, the borrower 505 can use the browser application 527 to send identification and/or authentication information (e.g., username, password, PIN, biometric information, ATM/debit/credit card number, etc.) to the mortgage apparatus 530, so that, for example, the mortgage apparatus 530 will initiate, execute, perform, complete, and/or otherwise facilitate any of the functions described and/or contemplated herein. It will be understood that the browser application 527 can include one or more computer-executable program code portions for instructing and/or causing the processor 524 to perform one or more of the functions of the browser application 527 and/or of the user interface apparatus 520 described and/or contemplated herein. In some embodiments, the browser application 527 may include and/or use one or more network and/or system communication protocols.

Also shown in FIG. 5, the user interface apparatus 520 includes the user interface 529. The user interface 529 can include and/or be embodied as one or more user interfaces. In some embodiments, the user interface 529 includes one or more user output devices for presenting information and/or one or more items to the borrower 505. Examples of output devices include, but are not limited to, one or more displays, speakers, receipt printers, dispensers (e.g., cash dispensers, mortgage information dispensers, etc.), and/or the like. In some embodiments, the user interface 529 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, scanners, biometric readers, motion detectors, cameras, card readers (e.g., for reading the magnetic strip on magnetic cards such as ATM, debit, credit, and/or bank cards, etc.), deposit mechanisms (e.g., for depositing checks and/or cash, etc.), and/or the like for receiving information from a user of the user interface apparatus 520 (e.g., the borrower 505, etc.).

FIG. 5 also illustrates the mortgage apparatus 530. The mortgage apparatus 530 may include any computerized apparatus that can be configured to perform any one or more of the functions of the mortgage apparatus 530 described and/or contemplated herein. It will also be understood that the mortgage apparatus 530 can include and/or be embodied as any mortgage apparatus described and/or contemplated herein. In some embodiments, for example, the mortgage apparatus 530 includes and/or is embodied as one or more servers, mainframes, engines, workstation computers, personal computers, network devices, front end systems, back end systems, and/or the like. In some embodiments, such as the one illustrated in FIG. 5, the mortgage apparatus 530 includes a communication interface 532, a processor 534, and a memory 536, which includes a mortgage application 537, a mortgage datastore 538, and a non-mortgage datastore 539 stored therein. As shown, the communication interface 532 is operatively and selectively connected to the processor 534, which is operatively and selectively connected to the memory 536.

It will be understood that, in some embodiments, the mortgage application 537 can be operable to initiate, perform, complete, and/or otherwise facilitate any one or more portions of the one or more embodiments described and/or contemplated herein, such as, for example, any one or more portions of the process flows 100, 200, and/or 400 described herein. For example, in some embodiments, the mortgage application 537 is operable to receive information associated with a mortgage loan and/or determine an exercisable option to incorporate into the mortgage loan. As another example, in some embodiments, the mortgage application 537 is additionally or alternatively operable to modify, upon exercise of an exercisable option, one or more terms of a mortgage loan in accordance with the option. As still another example, in some embodiments, the mortgage application 537 is operable to determine that a mortgage loan and/or a borrower associated with the mortgage loan are eligible to receive an exercisable option. As another example, in some embodiments, the mortgage application 537 is operable to store one or more terms of a mortgage loan and/or one or more terms of an exercisable option in memory (e.g., the mortgage datastore 538, etc.), so that, for example, the mortgage loan and/or the option can be provided, processed, and/or serviced in accordance with their terms. It will be understood that, in accordance with some embodiments, the mortgage application 537 is operable to perform any one or more of the functions described herein as being performed by "an apparatus," by the mortgage apparatus 530, and/or by the mortgage application 537.

In some embodiments, the mortgage application 537 enables the mortgage apparatus 530 to communicate with one or more other portions of the system 500, such as, for example, the mortgage datastore 538 and/or the user interface apparatus 520. Also, in some embodiments, the mortgage application 537 is operable to provide, purchase, process, and/or service one or more mortgage loans and/or other types of loans (e.g., student loan, etc.) and/or financial transactions (e.g., mortgage loan payments, purchase transactions, funds transfers, etc.). The mortgage application 537 can additionally or alternatively be operable to maintain one or more financial accounts (e.g., a mortgage loan account, checking account, etc.), which may, for example, be stored in the mortgage datastore 538. In some embodiments, the mortgage application 537 includes one or more computer-executable program code portions for causing and/or instructing the processor 534 to perform one or more of the functions of the mortgage application 537 and/or mortgage apparatus 530 described and/or contemplated herein. In some embodiments, the mortgage application 537 includes and/or uses one or more network and/or system communication protocols.

In addition to the mortgage application 537, the memory 536 also includes the mortgage datastore 538 and the non-mortgage datastore 539. It will be understood that each of these datastores can be configured to store any type and/or amount of information. For example, in some embodiments, the mortgage datastore 538 includes information associated with one or more mortgage loans and/or exercisable options. In some embodiments, the non-mortgage datastore 539 includes information associated with one or more non-mortgage relationships. For example, in some embodiments, the non-mortgage datastore 539 stores information associated with one or more non-mortgage financial accounts and/or non-mortgage financial transactions, such as for example, information associated with one or more checking, savings, investment, retirement, brokerage, and/or other financial accounts and/or transactions. In some embodiments, the non-mortgage datastore 539 additionally or alternatively includes information associated with one or more customers of a lender, such as, for example, information associated with an address, income, financial account, total account value, and/or credit score of the borrower 505. In some embodiments, the non-mortgage datastore 539 includes information associated with a non-mortgage relationship between the borrower 505 and the lender. In some embodiments, the mortgage datastore 538 and/or the non-mortgage datastore 539 can additionally or alternatively store any information related to providing, processing, and/or servicing a mortgage loan having one or more exercisable options. In some embodiments, the mortgage datastore 538 and/or the non-mortgage datastore 539 can additionally or alternatively store information associated with online banking and/or online banking accounts. Accordingly, it will be understood the non-mortgage datastore 539 and/or the mortgage datastore 538 can store any information that is stored by a mortgage lender and/or other financial institution.

It will also be understood that the mortgage datastore 538 and the non-mortgage datastore 539 may include any one or more storage devices, including, but not limited to, one or more datastores, databases, and/or any of the other storage devices typically associated with a computer system. It will also be understood that the mortgage datastore 538 and/or the non-mortgage datastore 539 may store information in any known way, such as, for example, by using one or more computer codes and/or languages, alphanumeric character strings, data sets, figures, tables, charts, links, documents, and/or the like. Further, in some embodiments, the mortgage datastore 538 and/or the non-mortgage datastore 539 may include information associated with one or more applications, such as, for example, the mortgage application 537 and/or the browser application 527. It will also be understood that, in some embodiments, the mortgage datastore 538 and/or the non-mortgage datastore 539 provide a real-time or near real-time representation of the information stored therein, so that, for example, when the processor 534 accesses the mortgage datastore 538 and/or the non-mortgage datastore 539, the information stored therein is current or nearly current.

Of course, it will be understood that the embodiment illustrated in FIG. 5 is exemplary and that other embodiments may vary. For example, in some embodiments, instead of the mortgage loan borrower 505, it is a loan officer, underwriter, and/or some other person associated with the mortgage loan 507 that accesses the user interface apparatus 520 (e.g., which can be a workstation computer, etc.) in order to initiate, perform, complete, and/or facilitate one or more portions of one or more of the embodiments described and/or contemplated herein. As another example, in some embodiments, some or all of the portions of the system 500 are combined into a single portion. Specifically, in some embodiments, the user interface apparatus 520 and the mortgage apparatus 530 are combined into a single mortgage apparatus that is configured to perform all of the same functions of those separate portions as described and/or contemplated herein. As another example, in some embodiments, the non-mortgage datastore 539 and the mortgage datastore 538 are combined into a single datastore. Likewise, in some embodiments, some or all of the portions of the system 500 are separated into two or more distinct portions. In addition, the various portions of the system 500 may be maintained by the same or separate parties. For example, in some embodiments, a mortgage lender may maintain the mortgage apparatus 530, whereas the borrower 505 may maintain the user interface apparatus 520. However, in other embodiments, a mortgage lender maintains both the mortgage apparatus 530 and the user interface apparatus 520 (e.g., where the mortgage apparatus 530 is an ATM transaction server and where the user interface apparatus 520 is an ATM, etc.).

It will also be understood that the system 500 (and/or one or more portions of the system 500) may include and/or implement any one or more portions of any one or more embodiments of the present invention described and/or contemplated herein. For example, in some embodiments, the system 500 (and/or one or more portions of the system 500) is configured to implement any one or more of the embodiments of the process flow 100 described and/or contemplated herein in connection with FIG. 1, any one or more of the embodiments of the process flow 200 described and/or contemplated herein in connection with FIG. 2, any one or more of the embodiments of the process flow 400 described and/or contemplated herein in connection with FIG. 4, and/or any one or more portions of the process flow described and/or contemplated herein in connection with FIG. 6.

As a specific example, in accordance with an embodiment of the present invention, the mortgage apparatus 530 is configured to: (1) receive information associated with the mortgage loan 507 from the user interface apparatus 520, as represented by the block 110 in FIG. 1; (2) determine the exercisable option 509 to incorporate into the mortgage loan 507, as represented by the block 120; (3) incorporate the option 509 into the mortgage loan 507, as represented by the block 130; and (4) modify, upon exercise of the option 509, one or more terms of the mortgage loan 507 in accordance with the option 509, as represented by the block 140. It will be understood that, in accordance with some embodiments, the user interface apparatus 520 and the mortgage apparatus 530 are each configured to send and/or receive information (e.g., data, images, messages, instructions, etc.) to and/or from each other, such that information sent from a first apparatus to a second apparatus can trigger that second apparatus to perform one or more portions of any one or more of the embodiments described and/or contemplated herein.

Referring now to FIG. 6, a mixed block and flow diagram of a system 600 for incorporating an exercisable option into a mortgage loan is provided, in accordance with a more-detailed embodiment of the present invention. As shown, the system 600 includes a user interface apparatus 601 (e.g., the user interface apparatus 520 shown in FIG. 5, a personal computer, a mobile phone, an ATM, etc.) and a mortgage apparatus 603 (e.g., the mortgage apparatus 530, a server, etc.). In accordance with some embodiments, the user interface apparatus 601 and the mortgage apparatus 603 may each include a communication interface, a user interface, a processor, a memory, an application, and/or a datastore, and those devices may be operatively connected to each other.

It will also be understood that the user interface apparatus 601 and the mortgage apparatus 603 are operatively and selectively connected to each other via one or more networks (not shown). It will be further understood that the user interface apparatus 601 is accessible to a user (e.g., the borrower 505, etc.). Also, in accordance with some embodiments, the mortgage apparatus 603 is maintained by a financial institution. In this example embodiment, the user is a borrower associated with a mortgage loan, and the mortgage loan is maintained by the same financial institution that maintains the mortgage apparatus 603. It will also be understood that the execution of the portions of the process flow represented by the blocks 602-624 occurs after the closing of the mortgage loan and/or during the life of the mortgage loan. As such, the exercisable option described below is "added on" to the mortgage loan.

As represented by the block 602, the user operates the user interface apparatus 601 to access a website maintained by the financial institution. Then, as represented by the block 604, the user logs in to the user's online banking account. In some embodiments, the website (and/or the user apparatus 601 and/or the mortgage apparatus 603) authenticates the user (i.e., confirms the identity of the user) based at least partially on, for example, one or more credentials the user presents to the website (e.g., username, password, PIN, biometric information, ATM/debit/credit card number, etc.). Also, in some embodiments, the user must be authenticated before the user can access the online banking account. After the user logs in to the online banking account, the user can view information associated with the user's mortgage loan, as well as information associated with one or more exercisable options that can be incorporated into the mortgage loan. For example, in some embodiments, the user may view, via the online banking account, the terms (e.g., features, obligations, etc.) of the options and/or the fees associated with the options (e.g., incorporation fees, exercise fees, etc.). In some embodiments, one or more options are presented to the user, via the online banking account, as one or more product offers by the financial institution. Once the user views the information associated with the options, the user selects an exercisable option from among the plurality of options to incorporate onto the mortgage loan, as represented by the block 606. Then, the user submits, via the online banking account, a request to incorporate the option into the mortgage loan (i.e., the "incorporation request") and an incorporation fee associated with incorporating the option into the mortgage loan, as represented by the block 608.

After receiving the incorporation request and the incorporation fee, the mortgage apparatus 603 determines whether the option is compatible with the mortgage loan, as represented by the block 610. It will be understood that, in some embodiments, the determining the compatibility is the same as determining whether the mortgage loan is eligible to receive the option. In some embodiments, if the mortgage apparatus 603 determines that the option is not compatible with the mortgage loan, then the mortgage apparatus 603 denies the incorporation request and refunds the incorporation fee. However, if the mortgage apparatus 603 determines that the option is compatible with the mortgage loan, then the mortgage apparatus 603 determines whether the user is eligible to receive the option, as represented by the block 612. For example, in some embodiments, the mortgage apparatus 603 determines whether the user is eligible to receive the option based at least partially on a non-mortgage relationship between the user and a lender associated with the mortgage loan. As another example, in some embodiments, the mortgage apparatus 603 determines whether the user is eligible based at least partially on whether the user pays the incorporation fee (and/or an exercise fee). As shown in FIG. 6, if the mortgage apparatus 603 determines that the borrower is eligible to receive the option, then the mortgage apparatus 603 approves the incorporation request, as represented by the block 614, and incorporates the option into the mortgage loan, as represented by the block 616.

Thereafter, as represented by the block 618, the mortgage apparatus 603 sends a notification to the user interface apparatus 601 (and/or to the online banking account) that indicates that the incorporation request has been approved and/or that the option has been incorporated into the mortgage loan. In some embodiments, the mortgage apparatus 603 sends the notification (e.g., email, text message, online banking message, social media communication, etc.) to the user interface apparatus 601 during the time the user is waiting for the incorporation request to be received and/or approved. In some embodiments, the notification is delivered visually to the user via a display of the user interface apparatus 601 and/or audibly via a speaker of the user interface apparatus 601. In addition to sending the notification, the mortgage apparatus 603 posts the terms of the option to the online banking account, as represented by the block 622. Thereafter, as represented by the blocks 620 and 624, the user may operate the user interface apparatus 601 to receive, read, and/or view the notification and/or the terms of the option posted to the online banking account.

It will be understood that the embodiment illustrated in FIG. 6 is merely exemplary and that other embodiments may vary without departing from the scope and spirit of the present invention. For example, in some embodiments, the one or more portions of the process flow that are performed by the mortgage apparatus 603 are instead performed by the user interface apparatus 601 (e.g., where the user interface apparatus 601 includes and/or is embodied as an ATM, etc.). As another example, in some embodiments, instead of the user being a borrower associated with the mortgage loan, the user is a loan officer associated with the mortgage loan, where the loan officer uses a workstation computer to select the option and/or submit the incorporation request and/or incorporation fee on behalf of a borrower. As still another example, in some embodiments, the mortgage apparatus 603 automatically determines the exercisable option to incorporate into the user's mortgage loan, and the mortgage apparatus 603 presents an offer to the user, via the user interface apparatus 601 and/or the online banking account, to incorporate the option into the mortgage loan. As still another example, in some embodiments, the user operates the user interface apparatus 601 to select the exercisable option to incorporate into the mortgage loan prior to the underwriting and/or closing of the mortgage loan. As a further example, in some embodiments, the mortgage apparatus 603 is further configured to exercise the option and/or modify one or more terms of the mortgage loan in accordance with one or more terms of the option.

It will also be understood that, in some embodiments, one or more of the portions of the process flow represented by the blocks 602-624 are triggered by one or more triggering events, which, in some embodiments, include the performance of one or more of the other portions of the process flow represented by the blocks 602-624. Also, in some embodiments, the system 600 is configured to perform the entire process flow represented by the blocks 602-624, from start to finish, within moments, seconds, and/or minutes (e.g., within 1-15 minutes, etc.). For example, in some embodiments, the mortgage apparatus 603 approves the incorporation request, incorporates the option into the mortgage loan, sends the notification, and/or posts the terms of the option to the online banking account, all within approximately 1-15 minutes of the mortgage apparatus 603 receiving the incorporation request and/or the incorporation fee from the user interface apparatus 601.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:
1. A method comprising:
  storing, in a non-transitory computer-readable medium, one or more terms of an exercisable option that is incorporated into an individual mortgage loan via a computing device processor, wherein the one or more terms of the option are tailored according to at least a non-mortgage relationship between a borrower associated with the mortgage loan and a lender associated with the mortgage loan;

exercising the option via a computing device processor; and automatically modifying one or more terms of the mortgage loan based on the exercised option via a computing device processor.

2. The method of claim 1, further comprising:
determining the non-mortgage relationship; and
determining the exercisable option based at least partially on the non-mortgage relationship.

3. The method of claim 1, further comprising:
determining the non-mortgage relationship; and
determining that the borrower associated with the mortgage loan is eligible to receive the option based at least partially on the non-mortgage relationship.

4. The method of claim 1, further comprising:
modifying, upon exercise of the option, the one or more terms of the mortgage loan in accordance with the option.

5. The method of claim 1, wherein exercising the option results in a modification of at least one of an interest rate, loan term, amortization term, number of loan payments, amount of the loan payments, or frequency of the loan payments associated with the mortgage loan.

6. The method of claim 1, wherein the one or more terms of the option comprise a term modification feature, such that exercising the option results in the term of the mortgage loan being extended, wherein the length of the extension is based at least partially on the non-mortgage relationship.

7. The method of claim 1, wherein the one or more terms of the option comprise a loan payment type modification feature, such that exercising the option results in a loan payment amount type associated with the mortgage loan being modified from a composite amount to an interest-only amount.

8. The method of claim 1, wherein the one or more terms of the option comprises a loan payment amount modification feature, such that exercising the option results in a loan payment amount associated with the mortgage loan being modified from a first amount to a second amount, wherein the second amount is based at least partially on the non-mortgage relationship.

9. The method of claim 1, wherein the one or more terms of the option comprise an interest rate modification feature, such that exercising the option results in the value of a fixed interest rate of the mortgage loan being modified from a first value to a second value, wherein the second value is based at least partially on the non-mortgage relationship.

10. The method of claim 1, wherein the one or more terms of the option comprise the number of times the option can be exercised, wherein the number is based at least partially on the non-mortgage relationship.

11. The method of claim 1, wherein the non-mortgage relationship comprises a value of one or more non-mortgage accounts, wherein the one or more non-mortgage accounts are associated with the borrower and maintained by the lender.

12. The method of claim 1, wherein the non-mortgage relationship comprises a length of time that one or more non-mortgage accounts associated with the borrower have been maintained by the lender.

13. The method of claim 1, wherein one or more identifiers are assigned to the non-mortgage relationship to indicate the relative strength of the non-mortgage relationship, and wherein the one or more terms of the option are based at least partially on the one or more identifiers.

14. A computer apparatus comprising:
a processor and a memory; and
a mortgage application software module stored in the memory, comprising executable instructions specifically configured such that when executed by the processor cause the processor to:
store in a non-transitory computer-readable medium one or more terms of an exercisable option; that is incorporated into an individual mortgage loan, wherein the one or more terms of the option are tailored according to at least a non-mortgage relationship between a borrower associated with the mortgage loan and a lender associated with the mortgage loan;
exercise the option; and
automatically modify one or more terms of the mortgage loan based on the exercised option.

15. The apparatus of claim 14, wherein
the processor is configured to:
determine the non-mortgage relationship; and
determine the exercisable option based at least partially on the non-mortgage relationship.

16. The apparatus of claim 14, wherein
the processor is configured to:
determine the non-mortgage relationship; and
determine that the borrower associated with the mortgage loan is eligible to receive the option based at least partially on the non-mortgage relationship.

17. The apparatus of claim 14, wherein the non-mortgage relationship comprises a value of one or more non-mortgage accounts, wherein the one or more non-mortgage accounts are associated with the borrower and maintained by the lender.

18. The apparatus of claim 14, wherein the non-mortgage relationship comprises a length of time that one or more non-mortgage accounts associated with the borrower have been maintained by the lender.

19. The apparatus of claim 14, wherein one or more identifiers are assigned to the non-mortgage relationship to indicate the relative strength of the non-mortgage relationship, and wherein the one or more terms of the option are based at least partially on the one or more identifiers.

20. A computer program product comprising a non-transitory computer-readable medium, wherein the non-transitory computer-readable medium comprises computer-executable program code portions stored therein, wherein the computer-executable program code portions comprise:
a first program code portion operable to determine a non-mortgage relationship between a borrower associated with an individual mortgage loan and a lender associated with the mortgage loan;
a second program code portion operable to determine an exercisable option to incorporate into the mortgage loan, wherein one or more terms of the option are tailored according to at least the non-mortgage relationship;
a third program code portion operable to exercise the option; and
a fourth program code portion operable to modify, upon exercise of the option, one or more term of the mortgage loan in accordance with the option.

21. The computer program product of claim 20, further comprising:
a third program code portion operable to determine that the borrower associated with the mortgage loan is eligible to receive the option based at least partially on the non-mortgage relationship.

22. The computer program product of claim 20, wherein the non-mortgage relationship comprises a value of one or more non-mortgage accounts, wherein the one or more non-mortgage accounts are associated with the borrower and maintained by the lender.

23. A method comprising:
incorporating an exercisable option into an individual mortgage loan via a computing device processor, wherein the incorporating the exercisable option is based at least partially on a non-mortgage relationship between a borrower associated with the mortgage loan and a lender associated with the mortgage loan;
exercising the option via a computing device processor; and
automatically modifying one or more of the terms of the mortgage loan based on the exercised option via a computing device processor.

24. A method comprising:
automatically modifying, upon exercise of an option, one or more terms of an individual mortgage loan via a computing device processor, wherein the option was incorporated into the mortgage loan prior to the exercise, and wherein the modifying the one or more terms of the mortgage loan is based at least partially on a non-mortgage relationship between a borrower associated with the mortgage loan and a lender associated with the mortgage loan.

* * * * *